Feb. 15, 1955
C. I. HILL
2,702,208
GAS LIFT DISENGAGER
Filed March 3, 1953
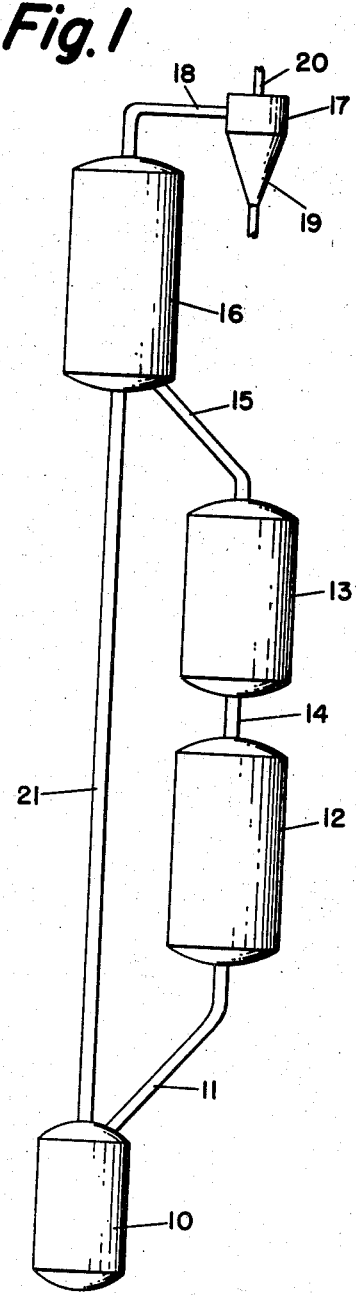
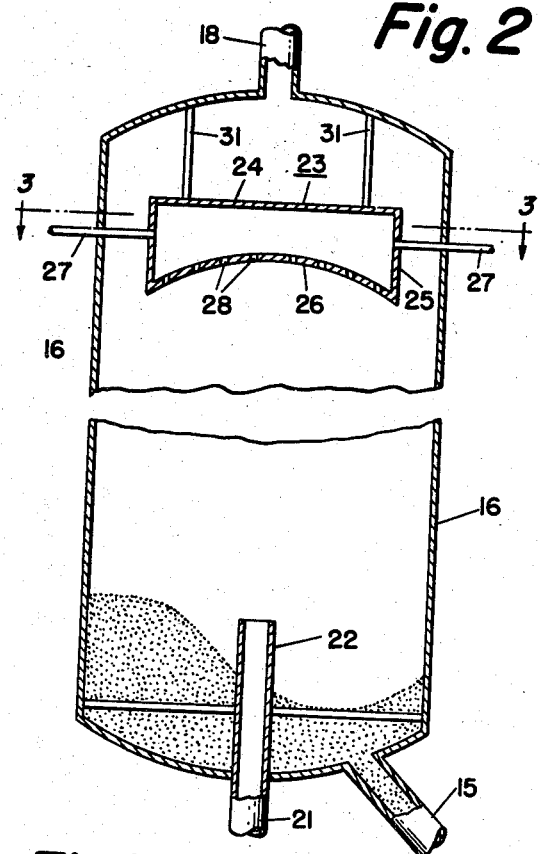
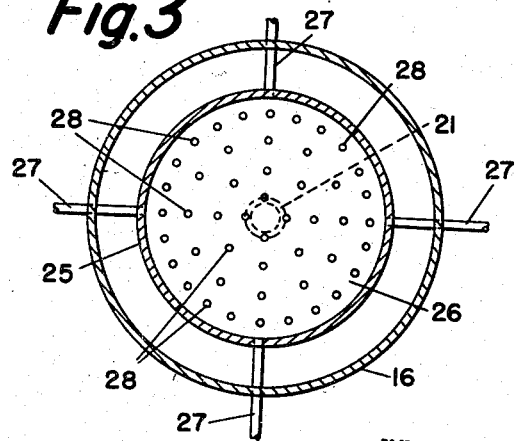
INVENTOR.
CLAUDE I. HILL
BY
Robert O. Spindle
ATTORNEY ial No. 184,601, filed September 13, 1950.

United States Patent Office 2,702,208
Patented Feb. 15, 1955

2,702,208

GAS LIFT DISENGAGER

Claude Ives Hill, Oak Harbor, Ohio, assignor to Sun Oil Company, Philadelphia, Pa., a corporation of New Jersey Application March 3, 1953, Serial No. 340,001

3 Claims. (Cl. 302—59)

This invention relates to the elevation of granular solids by means of lifting gas, and more particularly to the disengaging of granular solids from gas after such elevation.

Numerous industrial processes involve the continuous circulation of granular solids through a process system. Frequently in such processes, granular solids gravitate continuously through a reaction zone or zones and then are continuously elevated by means of a lifting gas from a level below the reaction zone or zones to a level thereabove. Upon reaching the higher level, the granular material is disengaged, that is separated, from gas and returned to the reaction zone or zones for gravitation again therethrough. The present invention relates to a novel method and apparatus for effecting such disengaging with a minimum of attrition of granular solids.

The moving bed catalytic conversions of hydrocarbon oil are examples of processes wherein granular solids can be elevated from a level below a conversion zone and other reaction zones such as a regeneration zone to a level above the reaction zones by means of a lifting gas, and wherein also it is highly undesirable that the granular solids should undergo excessive attrition.

The present invention provides method and apparatus whereby granular solids are elevated by lifting gas from an engager vessel through a lift conduit or a plurality of lift conduits to a disengager vessel in such fashion that the stream of gas and solids which continuously issues from the top of the lift conduit is prevented from rising beyond a relatively short distance above the top of the conduit and yet does not while rising strike any transverse rigid solid obstruction. In this manner, the present invention provides a lower degree of attrition than can be obtained with prior art method and apparatus, and also makes it possible to use shorter disengagers to handle solids at a given rate than can be used with prior art method and apparatus.

The invention will now be described with reference to the attached drawing.

Figure 1 is a diagrammatic view of a process system through which granular solids are continuously circulated, gravitating through reaction zones and being elevated by means of a lifting gas from a level below the reaction zones to a disengaging vessel above the reaction zones. Figure 2 is a sectional elevational view showing the disengager and illustrating the novel features of the invention. Figure 3 is a sectional plan view of the disengager.

Referring to Figure 1, 10 indicates the engager which receives catalyst or contact material by gravity through line 11 from a reaction zone such as a regenerator 12 positioned below an upper reaction zone 13 which is in communication with zone 12 through line 14 and which receives contact material by gravity continuously through line 15 from a disengager 16. Separating means such as a cyclone separator 17 are in communication with disengager 16 through line 18 and fines are removed by the separator through line 19 while the lifting medium is removed from the separator 17 through line 20. The lower end of lift conduit 21 is in communication with engager 10 while the upper end of the conduit 21 is in communication with disengager 16.

Means are provided adjacent the lower end of the conduit 21 to effectively start the lifting operation through each of the conduits independently. These can be any suitable means, such as those disclosed in co-pending application of John F. McKinney, Serial No. 184,601, filed September 13, 1950.

Figure 1 does not show any details of the present invention and is provided only to show the general arrangement of a system wherein catalyst or contact material is utilized in the form of a continuously moving mass.

Referring to Figures 2 and 3 which show details of the present invention, lift conduit 21 extends through the lower end of disengager 16 and the outlet end of lift conduit 21 is positioned a short distance within the lower portion of disengager 16. A spider 22 may be provided to maintain the conduit rigid.

Within disengager 16 and adjacent the top thereof is a gas chamber 23, which as shown in Figure 2 is composed of circular horizontal top plate 24, cylindrical sidewall 25, and transverse bottom plate 26 having perforations 28 therein and having its lower surface concave. Hangers 31 secure chamber 23 in place. Communicating with the interior of chamber 23 are conduits 27 which terminate exteriorly of disengager 16. Gas outlet 18 communicates with the top of disengager 16.

In operation, lifting gas is introduced into lift conduit 21 by way of engager 10, and granular solids are introduced into lift conduit 21 by way of line 11 and engager 10. Lifting gas having granular solids suspended therein passes upwardly as a confined stream through lift conduit 21 and is discharged from the outlet end thereof into the space provided in disengager 16 above the outlet end of conduit 21 and below chamber 23. This space allows substantially unrestricted lateral expansion of discharged gas as it rises above the outlet end of conduit 21. This space further allows granular solids to decrease in upward velocity to zero, through loss of momentum, without having struck any transverse rigid obstruction while rising and to fall back after reversal of direction into the receptacle provided by the bottom of disengager 16.

Braking gas is introduced into chamber 23 through conduits 27 and passes downwardly through perforations 28 as a plurality of horizontally spaced apart, substantially vertical streams. These streams discharge into the top of the space provided for reversal of direction of granular solids. The vertical streams of braking gas oppose the upward motion of the rising stream of gas and solids, and prevent the solids in the rising stream from striking the chamber 23. By tending to reduce the momentum of the rising stream, the braking gas promotes the reversal of direction of the granular solids and causes them to rise less high in the disengaging vessel than they would rise if the braking gas were not used.

The opposition to the braking gas provided by the lifting gas in the rising stream of gas and solids causes the braking gas to lose its downward velocity, and the lifting gas and braking gas commingle, pass around and above chamber 23, and are removed from disengager 16 through outlet 18.

The perforated plate defining the bottom of the chamber is preferably concave as shown in the drawing, because this serves to counteract any tendency which the solids might have to strike the disengager sidewall after reversing directions; however, such concavity is not necessary according to the invention, and a perforated plate which is flat or any other suitable shape can be used. The cross-section apparatus used according to the invention can be any suitable shape. The horizontal cross section of the lift conduit, disengager, and gas chamber can be circular, as shown in the drawing, or it can be rectangular or any other suitable shape.

The lift conduit 21 can be of any suitable known type. For example, it can have substantially constant cross-section throughout its length, or it can gradually increase in cross-section toward its upper end; or it can have secured to the top thereof an inverted frustoconical conduit section as disclosed and claimed in copending application of Clarence H. Thayer, Serial No. 202,306, filed December 22, 1950.

It is to be understood that the present invention contemplates, instead of a gas outlet at the top of the disengager, as shown in the drawing, a gas outlet below the top of lift conduit 21, in which case lifting gas and braking gas, after commingling, pass downwardly with the falling solids and are separated from solids by suitable known means at a level below the top of lift conduit 21. In such case, the chamber through which braking gas is admitted can be provided by: the top of the disengager, a perforated plate extending transversely across the disengager somewhat below the top thereof, and the portion of the disengager sidewall between the perforated plate and the top of the disengager.

Operation according to the present invention is advantageous in that the plurality of downwardly directed jets of braking air effectively prevent any part of the rising stream of gas and catalyst from rising to the level of the gas chamber. Thus, at a given lifting gas rate needed to lift solids at the required rate to satisfy the process conditions of the system, it is possible to use a disengager in which the gas chamber is so low in the apparatus that the solids would while rising strike the chamber if the braking gas were not used. By using the braking gas, an operation is achieved wherein the solids do not while rising strike a transverse rigid obstruction, even though the disengager is short enough that the solids would strike while rising a transverse rigid obstruction if braking gas were not used.

Apparatus and method according to the invention can be used to elevate granular solids generally, but they are particularly advantageously used with particle-form solid catalysts of the pellet or bead variety such as are commonly used in catalytic conversion of hydrocarbon oil. Such catalysts when freshly made are generally particles having major dimensions between, say, 1/16" and 3/4". Method and apparatus according to the invention are particularly effective to prevent excessive attrition of such catalysts.

In the method of the present invention, the velocity of solids upon discharge from lift conduit 21 should be within the approximate range 15 to 60 feet per second, as calculated according to the following equation:

$$U_s = U_g - 9.9\sqrt{\frac{D_s d_s}{d_g}}$$

where $U_s$ is solids velocity in feet per second, $U_g$ is gas velocity obtained by dividing the lifting gas rate in cubic feet per second by the average internal cross sectional area of the lift conduit in square feet, $D_s$ is average particle diameter (in feet) of the solids, and $$\frac{d_s}{d_g}$$

is the ratio of densities of the lifted solids and of the lifting gas. The subtracted term of the equation represents the slip velocity of the solids, i. e., the velocity at which they tend to fall through the surrounding gas. The velocity, $U_s$, of the solids, should be at least 15 feet per second in order to avoid any tendency for the lifting operation to become stalled; also, it should not be greater than 60 feet per second for otherwise excessive turbulence tends to occur when the braking gas impinges on the rising solids.

Preferably, the velocity at discharge of the braking gas through the apertures 28, which velocity may be determined by dividing the total volume rate of braking gas by the sum of the cross-sectional areas of the apertures, is within the approximate range 50 to 1500 feet per second. Preferably, the velocity of the lifting gas at discharge from the lift conduit, which velocity may be determined by dividing the volume rate of lifting gas by the cross-sectional area of the outlet of lift conduit 21, is within the approximate range 25 to 100 feet per second, and is preferably less than the braking gas velocity mentioned above; preferably, the ratio of the lifting gas velocity to the braking gas velocity is not greater than 0.9. On the other hand, the lifting gas volume rate is preferably greater than the total braking gas volume rate; preferably, the ratio of the total braking gas volume rate to the lifting gas volume rate is not greater than 0.9. The use of braking gas at a lower volume rate but higher velocity than the lifting gas has been found to avoid excessive turbulence in the disengager.

The present invention is advantageously applied to lifting operations wherein granular solids are elevated through elongated confined lift conduits whose heights may be, for example, 50 to 300 times the average major dimension of the cross-section of the lift conduit. Lift conduits of such height, sometimes exceeding 200 feet, are used, for example, in hydrocarbon conversion processes wherein granular particles of the conversion-supporting contact material are elevated from a low point in the conversion system to a high point therein.

This application is a continuation-in-part of my co-pending application Serial No. 203,341, filed December 29, 1950, now abandoned.

The invention claimed is:

1. In an apparatus for elevating granular solids by means of a lifting gas through a substantially vertically extending lift conduit the improvement which comprises: a disengaging vessel communicating with the upper end of said lift conduit and providing an enlarged space above said upper end of said lift conduit for upward passage of gas and granular solids and for reversal of direction of granular solids, and providing a space for collection of granular solids beneath the upper end of said lift conduit in a lower portion of said vessel; a gas chamber providing an upper boundary of said enlarged space, the bottom of said gas chamber having a plurality of horizontally spaced apart apertures therethrough; a gas conduit communicating with said gas chamber; a gas outlet communicating with said disengaging vessel; and a solids outlet from said lower portion of said vessel.

2. Apparatus according to claim 1 wherein the lower surface of said bottom of said chamber is concave.

3. Method for elevating granular solids by means of a lifting gas and for disengaging gas from solids after such elevation which comprises: passing lifting gas having solids suspended therein upwardly through a confined zone as a confined stream; discharging lifting gas and granular solids from said confined zone into an enlarged zone and upwardly therethrough as a freely laterally expanding stream; maintaining the velocity of said solids at discharge within the approximate range from 15 to 60 feet per second; discharging separately introduced braking gas in a plurality of horizontally spaced apart streams substantially vertically downwardly from above said enlarged zone into said expanding stream; maintaining the velocity of said braking gas at discharge substantially higher than the velocity of said lifting gas at discharge, and maintaining the total volume rate of discharge of said braking gas substantially less than the volume rate of discharge of said lifting gas from said confined zone; reversing the direction of movement of solids within said enlarged zone; and separating gas from solids.

References Cited in the file of this patent
UNITED STATES PATENTS

| | | |
|---|---|---|
| 1,825,707 | Wagner | Oct. 6, 1931 |
| 2,054,441 | Peebles | Sept. 15, 1936 |
| 2,106,869 | Falkenstein | Feb. 1, 1938 |
| 2,358,497 | Egloff | Sept. 19, 1944 |
| 2,643,161 | Shirk | June 23, 1953 |